(12) United States Patent
Schaepperle et al.

(10) Patent No.: US 11,895,613 B2
(45) Date of Patent: Feb. 6, 2024

(54) POSITIONING WITH MULTIPLE ACCESS POINTS

(71) Applicant: NOKIA TECHNOLOGIES OY, Espoo (FI)

(72) Inventors: Joerg Schaepperle, Stuttgart (DE); Luca Rose, Orsay (FR); Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 418 days.

(21) Appl. No.: 17/286,625

(22) PCT Filed: Oct. 19, 2018

(86) PCT No.: PCT/EP2018/078762
§ 371 (c)(1),
(2) Date: Apr. 19, 2021

(87) PCT Pub. No.: WO2020/078570
PCT Pub. Date: Apr. 23, 2020

(65) Prior Publication Data
US 2021/0368470 A1 Nov. 25, 2021

(51) Int. Cl.
*H04W 64/00* (2009.01)
(52) U.S. Cl.
CPC .................. *H04W 64/00* (2013.01)
(58) Field of Classification Search
CPC ........................................... H04W 64/00
USPC ..................................... 455/456.1
See application file for complete search history.

(56) References Cited

U.S. PATENT DOCUMENTS

| 7,167,712 B2 | 1/2007 | Ogino et al. | |
| 7,379,744 B2* | 5/2008 | Tamaki | H04W 64/00 |
| | | | 342/464 |
| 2004/0157621 A1 | 8/2004 | Yamasaki et al. | |
| 2013/0285855 A1* | 10/2013 | Dupray | H04W 4/029 |
| | | | 342/451 |

(Continued)

FOREIGN PATENT DOCUMENTS

| CN | 1951027 A | 4/2007 |
| CN | 103202075 A | 7/2013 |

(Continued)

OTHER PUBLICATIONS

International Search Report and Written Opinion dated Jul. 18, 2019 corresponding to International Patent Application No. PCT/EP2018/078762.

(Continued)

*Primary Examiner* — Don N Vo
(74) *Attorney, Agent, or Firm* — SQUIRE PATTON BOGGS (US) LLP

(57) ABSTRACT

A central node receives, from each of a plurality of access points providing access for user equipments to a communication network, a result of a measurement related to a position of a user equipment, receives additional information comprising at least one of an evaluation of the result of the measurement and a reference towards which the measurement was done, and calculates the position of the user equipment by combining the results of the measurements received from the plurality of access points using at least one of the evaluation and the reference.

20 Claims, 5 Drawing Sheets

(56) References Cited

U.S. PATENT DOCUMENTS

| 2015/0327018 | A1* | 11/2015 | Rehnberg | G01S 5/0205 |
|---|---|---|---|---|
| | | | | 370/252 |
| 2016/0345286 | A1* | 11/2016 | Jamieson | G01S 3/48 |
| 2017/0251332 | A1* | 8/2017 | Aldana | G01S 5/021 |
| 2020/0191901 | A1* | 6/2020 | Lindoff | H04B 17/318 |

FOREIGN PATENT DOCUMENTS

| CN | 103858495 | A | 6/2014 |
|---|---|---|---|
| CN | 107343315 | A | 11/2017 |
| EP | 2891896 | A1 | 7/2018 |
| WO | 2008016901 | A2 | 2/2000 |
| WO | 2008016901 | A3 | 2/2008 |

OTHER PUBLICATIONS

3GPP TS 25.305 V15.0.0 (Jun. 2018), Technical Specification, 3rd Generation Partnership Project; Technical Specification Group Radio Access Network; Stage 2 functional specification of User Equipment (UE) positioning in UTRAN (Release 15), Jun. 29, 2018, XP051589502.

3GPP TS 38.305 V15.1.0 (Sep. 2018), Technical Specification, 3rd Generation Partnership Project; Technical Specification Group Radio Access Network; NG Radio Access Network (NG-RAN); Stage 2 functional specification of User Equipment (UE) positioning in NG-RAN (Release 15), Sep. 26, 2018, pp. 1-63, XP051487394.

First Examination Report dated Sep. 7, 2021 corresponding to Indian Patent Application No. 202147018031.

Communication pursuant to Article 94(3) EPC dated Jan. 30, 2023, corresponding to European Patent Application No. 18789416.7.

3GPP TS 36.355 V15.1.0 (Sep. 2018), Technical Specification, 3rd Generation Partnership Project; Technical Specification Group Radio Access Network; Evolved Universal Terrestrial Radio Access (E-UTRA); LTE Positioning Protocol (LPP) (Release 15), Oct. 1, 2018, pp. 1-217, XP051487510.

Chinese Office Action issued in corresponding Chinese Patent Application No. 201880100357.3 dated Oct. 7, 2023.

* cited by examiner

POSITIONING WITH MULTIPLE ACCESS POINTS

TECHNICAL FIELD

At least some embodiments relate to positioning with multiple access points e.g. in a 5G new radio communication system, using e.g. direction of arrival estimation.

BACKGROUND

In current mobile communication systems, positioning is done primarily based on observed time-difference of arrival (OTDOA) and uplink time-difference of arrival (UTDOA) measurements. In OTDOA, a UE estimates its position based on three different reference signal arrival times, whereas in UTDOA the estimation is performed at network level.

LIST OF ABBREVIATIONS

3GPP Third Generation Partnership Project
5G Fifth Generation
AoA Angle of arrival
BS Base Station
CU Central Unit of gNodeB
DoA Direction of Arrival
DU Distributed Unit of gNodeB
ID Identifier
IoT Internet of Things
NR New Radio (3GPP 5G)
NRP NR Positioning
OTDOA Observed Time-Difference Of Arrival
RSRP Reference Signal Received Power
TDOA Time-Difference Of Arrival
TRX Transceiver
UE User Equipment
UTDOA Uplink Time-Difference Of Arrival

SUMMARY

Accuracies of current methods based on TDOA, which have primarily been designed for frequencies below 6 GHz and low to moderate numbers of antenna elements are no longer sufficient.

At least some embodiments aim at providing positioning with improved accuracy for applications like, e.g., IoT and Industry 4.0.

At least some embodiments target at defining a framework for positioning in a mobile communication system with distributed antenna nodes based on measuring position related information at individual nodes and combining this information at a central location server to an improved position measurement.

According to at least some embodiments, improved accuracy is provided due to inclusion of angular information from multiple sites.

According to at least some embodiments, improved accuracy is provided by weighted combining using a quality indicator for deriving the weights.

According to at least some embodiments, accuracy is increased by increasing the number of measurements, e.g. number of access points, distance and/or angle.

According to at least some embodiments, resources are saved by selecting only a subset of measurements to have only light overhead.

According to at least some embodiments, methods, apparatuses and non-transitory computer-readable media are provided as defined in the appended claims.

According to an example embodiment, an apparatus of a plurality of apparatuses is provided, which provide access for user equipments to a communication network, the apparatus comprising at least one processor and at least one memory including computer program code, the at least one memory and the computer program code configured to, with the at least one processor, cause the apparatus at least to perform:

acquiring a result of a measurement related to a position of a user equipment;

acquiring additional information comprising at least one of an evaluation of the result of the measurement and a reference towards which the measurement was done, wherein the additional information is to be used for combining results of measurements related to the position of the user equipment, which have been acquired by the plurality of apparatuses; and transmitting, in at least one message, at least one of the result of the measurement and the additional information.

According to an example implementation, the apparatus comprises an access point.

According to an example implementation, the apparatus comprises at least one item of the following group: a base station, a base transceiver station, a radio head, a remote radio head, a gNodeB, a distributed unit, and a distributed unit of a gNodeB, the result of the measurement comprises at least one item of the following group: a delay time of signals transmitted between the user equipment and the access point, a time of arrival of signals transmitted between the user equipment and the apparatus, a received signal strength of signals transmitted between the user equipment and the apparatus, a distance between the user equipment and the apparatus, an angle of arrival of signals transmitted between the user equipment and the apparatus, and a direction of arrival of signals transmitted between the user equipment and the apparatus, the reference comprises at least one of a reference direction to which the angle of arrival was measured and an orientation of an antenna array, and the evaluation comprises a quality of the measurement comprising at least one item of the following group: a reliability of the measurement, a likelihood of the measurement, a quality index of the measurement, and a signal to noise ratio on a channel via which the signals transmitted between the user equipment and the apparatus are received.

According to an example implementation, the acquiring a result of a measurement comprises:

estimating, by the apparatus, position information on the position of the user equipment;

the acquiring additional information comprises:

estimating a reliability of the estimated position information; and the transmitting comprises:

transmitting the estimated position information as the result of the measurement, and transmitting the estimated reliability as the evaluation.

According to an example implementation, the estimating position information comprises at least one of:

measuring at least one of a direction and an angle of arrival of signals from the user equipment relative to a reference direction;

measuring at least one of a direction and an angle of arrival of signals from the user equipment relative to an orientation of an antenna array of the apparatus;

measuring a distance between the apparatus and the user equipment by measuring a received power of reference signals;

measuring a distance between the apparatus and the user equipment by measuring propagation time; and measuring a delay time of signals communicated between the apparatus and the user equipment.

According to an example implementation, the acquiring a result of a measurement comprises:

measuring, by the apparatus, an angle of arrival of signals from the user equipment relative to a reference direction;

the reference comprises the reference direction in a coordinate system common to the plurality of apparatuses; and the transmitting comprises:

transmitting the angle of arrival as the result of the measurement.

According to an example implementation, the transmitting further comprises transmitting the reference direction as the reference.

According to an example implementation, the acquiring a result of a measurement comprises receiving the result of the measurement from the user equipment.

According to an example implementation, the acquiring additional information comprises receiving the additional information from at least one of the user equipment, another apparatus of the plurality of apparatuses, and a database of the communication network.

According to an example implementation, the at least one memory and the computer program code are configured to, with the at least one processor, cause the apparatus to further perform:

receiving an indication of user specific position reference signals from at least one of a central node and another apparatus of the plurality of apparatuses.

According to an example implementation, the at least one memory and the computer program code are configured to, with the at least one processor, cause the apparatus to further perform:

using the user specific position reference signals for acquiring the result of the measurement related to the position of the user equipment.

According to an example implementation, the at least one memory and the computer program code are configured to, with the at least one processor, cause the apparatus to further perform:

transmitting the indication of user specific position reference signals to the user equipment.

According to an example implementation, the at least one memory and the computer program code are configured to, with the at least one processor, cause the apparatus to further perform:

receiving a request to perform at least one of measurements and estimations for acquiring position information and transmit the results of the measurements or estimations to a central node; and in response to the request, acquiring and transmitting to the central node at least one of the result of the measurement and the additional information.

According to an example implementation, the receiving comprises:

receiving at least one of the indication and the request from at least one of the central node and another apparatus of the plurality of apparatuses.

According to an example implementation, the at least one memory and the computer program code are configured to, with the at least one processor, cause the apparatus to further perform:

transmitting at least one of an indication of user specific position reference signals and a request to perform at least one of measurements and estimations for acquiring position information to at least one other apparatus of the plurality of apparatuses.

According to an example implementation, the at least one memory and the computer program code are configured to, with the at least one processor, cause the apparatus to further perform:

receiving, from at least one other apparatus of the plurality of apparatuses, at least one message comprising at least one of a result of a measurement related to the position of the user equipment and additional information comprising at least one of an evaluation of the result of the measurement and a reference towards which the measurement was done; and transmitting the at least one message to a central node.

According to an example implementation, the at least one memory and the computer program code are configured to, with the at least one processor, cause the apparatus to further perform:

transmitting a request for the additional information to at least one of the user equipment, another apparatus of the plurality of apparatuses, and a database of the communication network.

According to an example embodiment, an apparatus of a communication network is provided, the apparatus comprising at least one processor and at least one memory including computer program code, the at least one memory and the computer program code configured to, with the at least one processor, cause the apparatus at least to perform:

receiving, from each of a plurality of access points, a result of a measurement related to a position of a user equipment;

receiving additional information comprising at least one of an evaluation of the result of the measurement and a reference towards which the measurement was done; and calculating the position of the user equipment by combining the results of the measurements received from the plurality of access points using at least one of the evaluation and the reference.

According to an example implementation, the apparatus comprises a central node.

According to an example implementation, the central node comprises at least one item of the following group: a location server, a central unit, and a central unit of a gNodeB.

According to an example implementation, the at least one memory and the computer program code are configured to, with the at least one processor, cause the apparatus to further perform:

transmitting an indication of user specific position reference signals to be used for acquiring the result of the measurement related to the position of the user equipment to at least one of the plurality of access points; and/or transmitting a request to at least one of the plurality of access points to perform at least one of measurements and estimations for acquiring position information and transmit the results of the measurements or estimations to the apparatus.

According to an example implementation, the at least one memory and the computer program code are configured to, with the at least one processor, cause the apparatus to further perform:
  indicating the calculated position to at least one of the user equipment and the communication network.

According to an example implementation, the at least one memory and the computer program code are configured to, with the at least one processor, cause the apparatus to further perform:
  receiving the additional information from at least one of: the user equipment, at least one of the plurality of access points, and a database of the communication network.

According to an example embodiment, an apparatus is provided, comprising at least one processor and at least one memory including computer program code, the at least one memory and the computer program code configured to, with the at least one processor, cause the apparatus at least to perform:
  acquiring additional information comprising at least one of an evaluation of a result of a measurement related to a position of the apparatus and a reference towards which the measurement was done, wherein the additional information is to be used for combining results of measurements related to the position of the apparatus, which are acquired by a plurality of access points which provide access for apparatuses to a communication network; and
  transmitting the additional information to at least one of the plurality of access points.

According to an example implementation, the apparatus comprises a user equipment.

According to an example implementation, the at least one memory and the computer program code are configured to, with the at least one processor, cause the apparatus to further perform:
  receiving, from the at least one access point, at least one of:
    an indication of user specific position reference signals to be used for performing the measurement related to the position of the apparatus, and
    a request for the additional information.

According to an example implementation, the reference comprises at least one item of the following group:
  a number of antennas of the access point,
  a height of an antenna array of the access point on the ground,
  a height of an antenna array of the user equipment on the ground,
  an orientation of an antenna array of the access point,
  an orientation of an antenna array of the user equipment,
  an orientation of individual antenna positions of the access point,
  an orientation of individual antenna positions of the user equipment,
  an identifier of the access point,
  an indication of an active or passive state of the access point,
  antenna weights selected for precoding or reception at the access point during communication with the user equipment,
  beam identifier and/or direction of beams selected for communication with the user equipment, and
  geometrical information about antenna setup, and
wherein the evaluation comprises a likelihood of the result of the measurement related to the position of the user equipment.

In the following example embodiments and example implementations will be described with reference to the accompanying drawings.

DESCRIPTION OF THE EMBODIMENTS

At least some embodiments define a framework for positioning in a mobile communication system with distributed antenna nodes based on measuring position related information at individual nodes and combining this information at a central location server to an improved position measurement.

According to an example embodiment, the measurements performed at the individual antenna nodes (also referred to as antenna sites) include direction-of-arrival measurements.

According to at least some embodiments, additional information comprising at least one of an evaluation of measurements performed at the individual antenna nodes and a reference towards which the measurement was done, is reported that is required for combining the measurements at the central location server in an optimum way to a position measurement with improved accuracy.

According to an example embodiment, this evaluation is a quality measure which allows for optimum weighting of the individual measurements before combining them into an improved position estimation. The quality measure may be represented by a reliability of the measurement, a likelihood of the measurement, a quality index of the measurement, and a signal to noise ratio on a channel via which the signals transmitted between the user equipment and the access point are received.

According to an example embodiment, the reference is information on a reference direction, e.g. an orientation of an antenna array at at least one of individual antenna sites relative to the reference direction common to multiple sites, which allows for combining the direction-of-arrival measurements to a position measurement.

Figure 1:
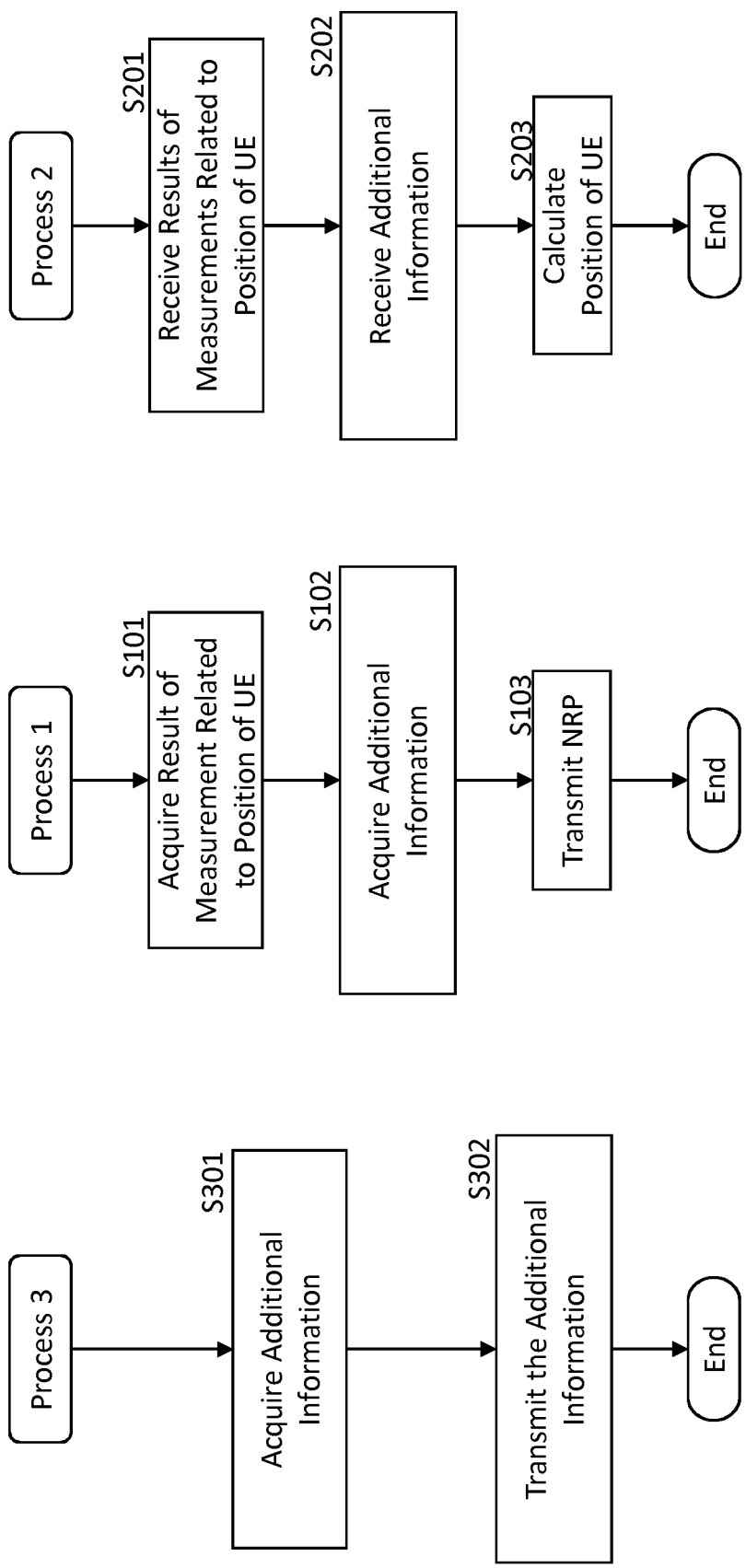
FIG. 1 shows flowcharts illustrating processes for performing positioning according to at least some embodiments.

FIG. 1 shows flowcharts illustrating processes for performing positioning in a mobile communication system according to at least some embodiments.

Process 1 may be executed by an access point (e.g. an antenna node) of a plurality of access points (e.g. antenna nodes) which provide access for user equipments to a communication network of the mobile communication system.

In step S101, a result of a measurement related to a position of a user equipment is acquired. According to an example embodiment, the measurement is performed by the access point.

In step S102, additional information comprising at least one of an evaluation of the result of the measurement and a reference towards which the measurement was done, is acquired. The additional information is to be used for combining results of measurements related to the position of the user equipment, which have been acquired by the plurality of access points.

According to an example embodiment, the additional information is estimated by the access point. According to another example embodiment, the additional information is received from a user equipment. According to still another example embodiment, the additional information is acquired from a database of the mobile communication system.

In step S103, at least one of the result of the measurement and the additional information comprising the evaluation is transmitted in at least one message.

According to an example implementation, in case the additional information is an evaluation of a measurement result, it is transmitted from the access point which performed the measurement to a central node (e.g. location server) each time a measurement is done and reported.

According to another example implementation, in case the additional information is, e.g., a reference direction like an antenna array orientation, this information is determined only when it changes, e.g., when the antenna array is set up. According to an example implementation, the additional information is signaled from the access point with the antenna array to the central node. According to an example implementation, the additional information is stored in a database e.g. at the antenna site or in any other node in the communication network. According to an example implementation, the central node requests the additional information from the database.

It is to be noted that the process in step S103 covers the following options:
1. Transmitting the additional information together with the result of measurement.
2. Transmitting only the additional information.
3. Transmitting only the result of measurement.

In above case 3, the additional information are transmitted separately from the result of measurement. According to an example implementation, the additional information are requested from the database.

Process 2 shown in FIG. 1 may be executed by a central node (e.g. a location server) of the communication network.

In step S201, from a plurality of access points, a result of a measurement related to a position of a user equipment is received.

In step S202, additional information comprising at least one of an evaluation of the result of the measurement and a reference towards which the measurement was done is received.

In step S203, the position of the user equipment is calculated by combining the results of the measurements received from the plurality of access points using at least one of the evaluation and the reference.

Process 3 shown in FIG. 1 may be executed by a user equipment accessing the communication network.

In step S301, additional information comprising at least one of an evaluation of a result of a measurement related to a position of the user equipment and a reference towards which the measurement was done is acquired. The additional information is to be used for combining results of measurements related to the position of the user equipment, which are acquired by a plurality of access points which provide access for user equipments to the communication network.

In step S302, the additional information is transmitted as additional information to at least one of the plurality of access points.

According to a first example embodiment, processing in step S101 of process 1 comprises measuring direction of arrival (DoA) at the access points (e.g. antenna sites, distributed units (DU) in 3GPP NR).

According to the first example embodiment, processing in step S103 of process 1 comprises reporting antenna orientation as the reference acquired in step S102 and the DoA measured in step S101 relative to an antenna array of the access point to the central node (e.g. a location server) either in one or in separate messages.

According to the first example embodiment, processing in step S203 of process 2 comprises estimating position at the central node based on the DoA measurements received in step S201 and the antenna array orientations received in step S202.

According to an example embodiment, position information calculated in step S203 is distributed to authorized recipients.

According to a second example embodiment, processing in step S101 comprises measuring any position related quantity like, e.g., distance or time-delay at the access points (e.g. antenna sites).

According to the second example embodiment, processing in step S103 of process 1 comprises reporting result of the measurements of step S101 and for at least one of the measurements the quality of that measurement (acquired in step S102) to a central node (e.g. location server).

According to the second example embodiment, processing in step S203 of process 2 comprises combining the measurements to an improved estimation using a weighted approach, where the weights depend on the reported quality.

The first and second example embodiments can be combined.

According to an example embodiment, an access point has an estimation of at least one of angle or arrival (AoA), distance and delay time.

According to an example implementation, the access point estimates the AoA through a system like MUSIC if lower frequencies are adopted.

According to another example implementation, the access point estimates the AoA through beam-sweeping if higher frequencies are adopted (e.g. very high frequency, millimeter wave).

According to an example implementation, the access point estimates the distance from a reference signal received power (RSRP). According to another example implementation, the access point estimates the distance from propagation time measurements.

According to an example implementation, the access point measures the position of the user equipment from a time of arrival of signals transmitted between the user equipment and the access point.

According to an example implementation, the access point measures the position of the user equipment from a received signal strength of signals transmitted between the user equipment and the access point.

According to an example embodiment, there are two types of access points (e.g. BSs), namely active access points and passive access points.

Active access points (e.g. BSs) have both distance and angle of arrival estimation. For instance, they are actually serving the mobile communication system (e.g. NR) with a narrow beam.

Passive access points (e.g. BSs) are able to estimate the distance e.g. by receiving reference signals, but they do not perform beamforming to the NR.

According to an example embodiment, the information acquired by the plurality of access points is centralized and combined in a weighted system. The weights reflect the reliability of the position information. An example of reliability estimation is a link budget between the NR and the BS.

According to an example embodiment, statistical a priori knowledge about UE positions are used to improve estimation accuracy.

Figure 2:
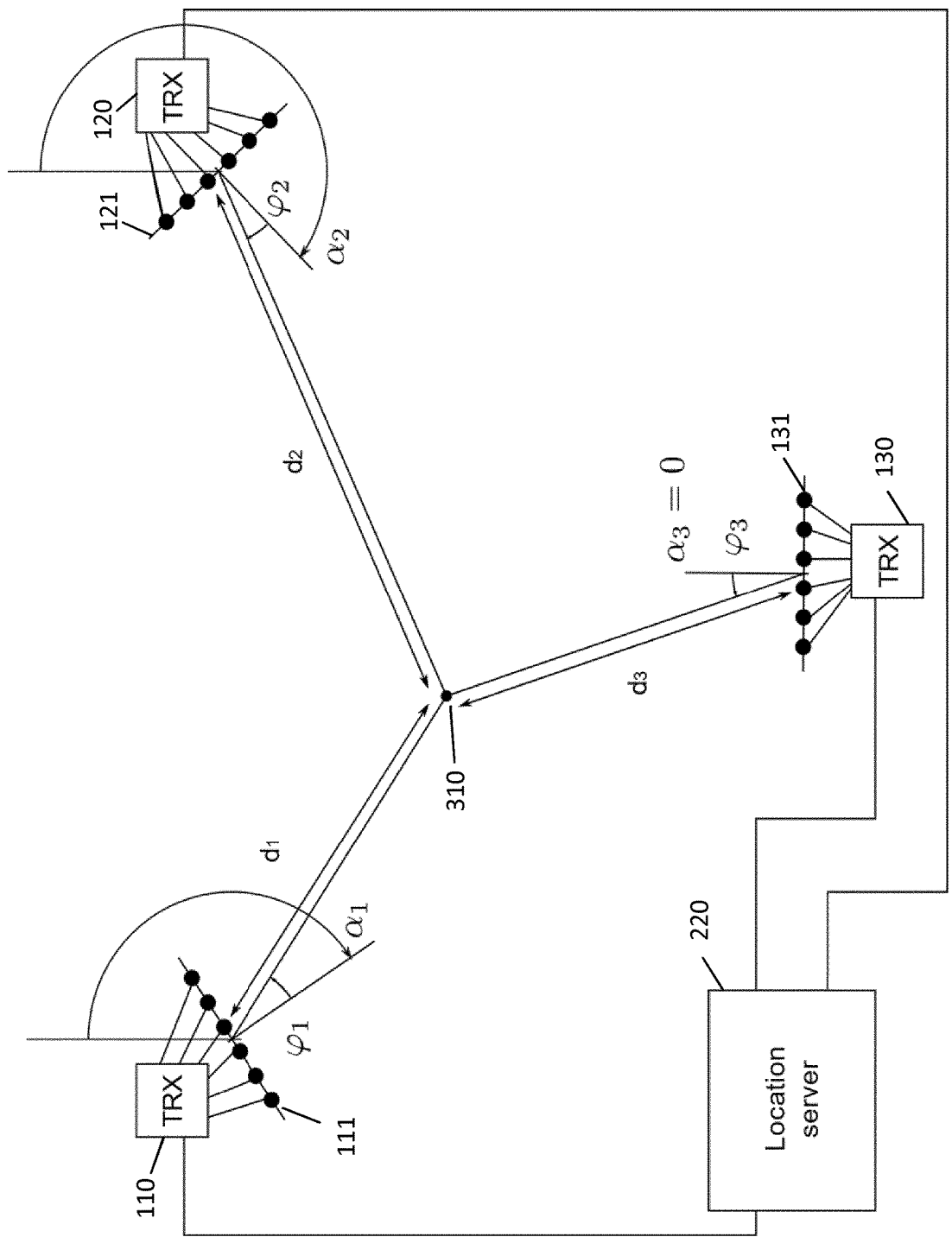
FIG. 2 shows a diagram illustrating an arrangement for performing positioning according to an example embodiment.

FIG. 2 shows a diagram illustrating an arrangement for performing positioning according to an example embodiment. FIG. 2 depicts a location server 220 as an example of a central node of a communication network, and transceivers 110, 120 and 130 as examples of access points providing access for user equipments to the communication network. Each of the transceivers 110, 120, 130 comprises an antenna array 111, 121, 131.

Transceiver 110 estimates a distance d1 from the antenna array 111 to a point 310, e.g. a possible position of a user equipment, and an angle of arrival $\varphi 1$ of signals transmitted between the user equipment and the transceiver 110. Additional information acquired by the transceiver 110 is an orientation $\alpha 1$ of the antenna array 111. In other words, the orientation $\alpha 1$ represents a reference for the estimated distance d1 and the angle of arrival $\varphi 1$.

The transceiver 110 transmits the distance d1, the angle of arrival $\varphi 1$ and the orientation $\alpha 1$ to the location server 220.

Transceiver 120 estimates a distance d2 from the antenna array 121 to the point 310, e.g. the possible position of a user equipment, and an angle of arrival $\varphi 2$ of signals transmitted between the user equipment and the transceiver 120. Additional information acquired by the transceiver 120 is an orientation $\alpha 2$ of the antenna array 121. In other words, the orientation $\alpha 2$ represents a reference for the estimated distance d2 and the angle of arrival $\varphi 2$.

The transceiver 120 transmits the distance d2, the angle of arrival $\varphi 2$ and the orientation $\alpha 2$ to the location server 220.

Transceiver 130 estimates a distance d3 from the antenna array 131 to the point 310, e.g. the possible position of a user equipment, and an angle of arrival $\varphi 3$ of signals transmitted between the user equipment and the transceiver 130. Additional information acquired by the transceiver 130 is an orientation $\alpha 3$ of the antenna array 131. In other words, the orientation $\alpha 3$ represents a reference for the estimated distance d3 and the angle of arrival $\varphi 3$.

The transceiver 130 transmits the distance d3, the angle of arrival $\varphi 3$ and the orientation $\alpha 3$ to the location server 220.

Based on the orientations $\alpha 1$, $\alpha 2$, $\alpha 3$, the location server 220 combines the distances d1, d2, d3 and the angles of arrival $\varphi 1$, $\varphi 2$, $\varphi 3$ to a position measurement for point (e.g. for the user equipment at point) 310.

Figure 3:
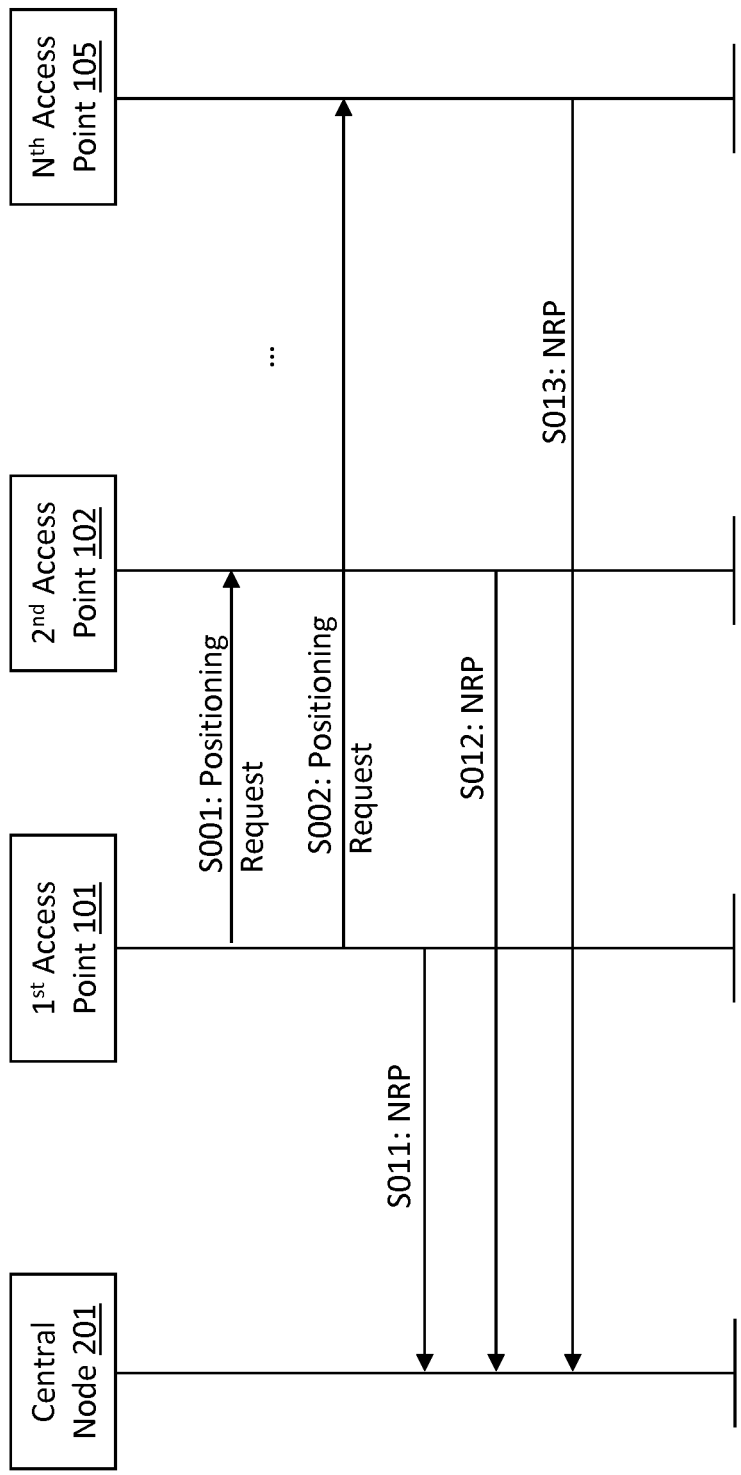
FIG. 3 shows a signaling diagram illustrating a message exchange for performing positioning according to an example embodiment.

FIG. 3 shows a signaling diagram illustrating a message exchange for performing positioning according to an example embodiment.

In step S001, a first access point (e.g. BS1) 101 of a plurality of access points of a mobile communication system transmits a message "positioning request" requesting positioning e.g. of a UE to a second access point (e.g. BS2) 102. The first access point 101 may transmit the message "positioning request" also to further access points of the plurality of access points, e.g. an Nth access point (BSN) 105 in step S002.

In step S011, the first access point 101 transmits a message "NRP" to a central node (e.g. location server) 201 of the mobile communication system. The NRP message contains at least one of the information acquired by the first access point 101 according to steps S102 and S103 of FIG. 1.

Similarly, in steps S012 and S013, the second access point 102 and the Nth access point 105 transmit an NRP message to the central node 201. The NRP message contains at least one of the information acquired by the second access point 102 and the Nth access point 105 according to steps S102 and S103 of FIG. 1.

According to another example embodiment, the second access point 102 and the Nth access point 105 transmit the NRP messages to the first access point 101 which forwards the NRP messages to the central node 201.

Figure 4:
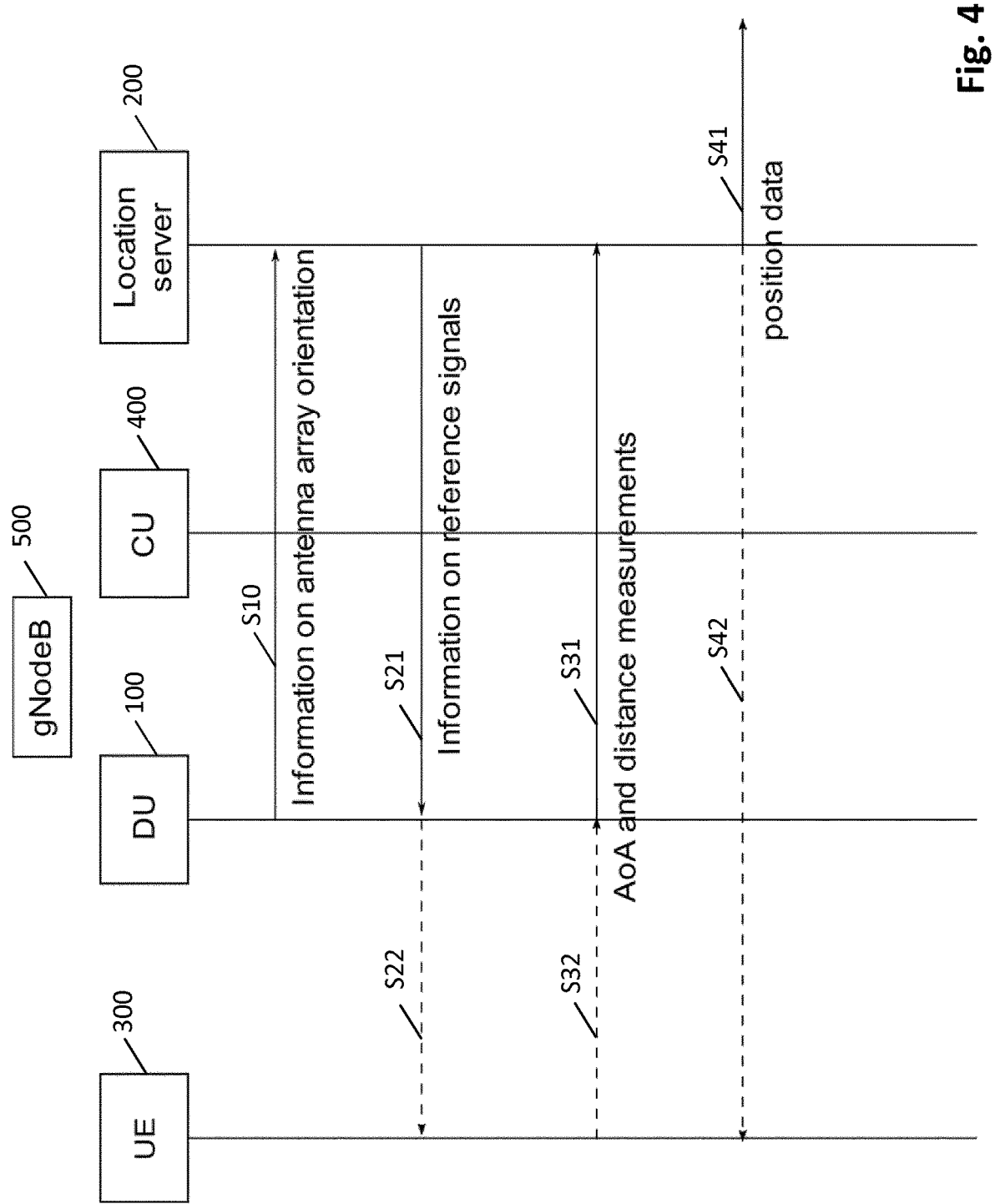
FIG. 4 shows a signaling diagram illustrating a message exchange for performing positioning according to an example embodiment.

FIG. 4 shows a signaling diagram illustrating a message exchange for performing positioning according to an example embodiment.

A distributed unit (DU) (acting as access point in this example embodiment) 100 transmits, in step S10, information on an antenna array orientation to a location server (acting as central node in this example embodiment) 200. The DU 100 may belong to a gNodeB 500 of a 5G network, the gNodeB 500 comprising the DU 100 and a central unit (CU) 400. According to an example implementation, the antenna array orientation comprises at least one of the orientations $\alpha 1$, $\alpha 2$, $\alpha 3$ shown in FIG. 2.

In step S21, the location server 200 transmits information on reference signals that may be used for positioning to the DU 100. According to an example implementation, the DU 100 forwards this information to a UE for which the positioning may be performed, in step S22. According to an implementation example, the references signals are user specific position reference signals which are transmitted on selected beams.

In step S31, the DU 100 transmits acquired results of AoA and distance measurements to the location server 200. According to an example implementation, the results comprise at least one of distances d1, d2, d3 and angles of arrival $\varphi 1$, $\varphi 2$, $\varphi 3$ shown in FIG. 2.

The location server 200 combines the results transmitted in S31 based on the information transmitted in S10, and transmits position data to dedicated recipients in step S41 and to the UE 300 in step S42.

In a 5G network, multipoint precoding is envisaged. Furthermore, in very high frequency (fc>52 GHz) scenarios, the large densification of the network, the prevalence of line-of-sight channel and very narrow beams can lead to very precise position estimations.

According to an example implementation, in the 5G network, an NR entity (e.g. central node 201 of FIG. 3, location server 220 of FIG. 2, location server 200 of FIG. 4) transmits RSs for channel estimation/sounding which is received by BSs (e.g. access points 101, 102, 105 of FIG. 3, TRXs 110, 120, 130 of FIG. 2, DU 100 of FIG. 4). Each BS computes an optimal beam (e.g. AoA) and a reference signal received power (RSRP). The estimated AoA and the RSRP are combined to compute NR positioning through weighted triangulation, exploiting the specific characteristics of the 5G network.

According to an example implementation, a BS obtains a location of the NR entity and transmits messages to neighboring BSs demanding for cooperation e.g. as illustrated in FIG. 3 by the positioning requests of steps S001 and S002. Upon positive acknowledgement, each cooperating BS (e.g. first access point 101, second access point 102, Nth access point 105 of FIG. 3) feeds back NRP messages e.g. as shown in steps S011, S012, S013 of FIG. 3.

According to an example implementation, the NRP messages comprise measurements of at least one of distances, angles of arrival, optimal beams from a set of beams and beam directions in analog phased arrays. The measurements are performed at the antenna sites (e.g. DUs, one of which is shown in FIG. 4 as DU 100) and/or UEs (one of which is shown in FIG. 4 as UE 300).

According to an example implementation, geometrical information on antenna locations and orientation is reported (as shown e.g. by step S10 of FIG. 4) from antenna sites over intermediate nodes to a central location server, e.g. the location server 200 of FIG. 4.

According to an example implementation, the central location server makes decisions on measurements to be performed based on the geometrical information.

According to an example implementation, the central location server signals measurements to be performed and positioning reference signals to antenna sites or UEs, as illustrated in steps S21, S22 of FIG. 4, for example.

According to an example implementation, the measurement or estimation data is reported directly to the central location server.

According to another example implementation, the measurement or estimation data is reported over intermediate nodes to the central location server.

According to an example implementation, the location server calculates a position estimate based on the reported data. The location server may calculate the position data based on a weighted combination of the measured data.

According to an example implementation, the location server distributes the calculated position data.

According to an example implementation, the calculation of position data can also be based on a time series of measurements and may also include a prediction of future positions.

According to an example implementation, a message NRP (as shown e.g. in FIG. 3) or a group of messages NRP from an access point (e.g. gNodeB, DU of a gNodeB) to a central node (e.g. CU of a gNodeB, location server) or from a DU to a CU contains a result of a measurement related to the position of a UE, and additional information that allows the combining of measurements from different sites at the location server. The additional information may comprise the orientation of an antenna array relative to which the angle of arrival was measured, and/or a quality measure for a position measurement, which allows for a weighted combination of the measurements from different sites at the location server. The result of measurement related to the position of the UE may comprise at least one of delay, distance and angle of arrival.

According to a first example implementation, the message or group of messages NRP contains the position of the NR measure by the gNB as the result of measurement related to the position of the UE, and the estimated reliability of the position estimation as the additional information.

According to a second example implementation, the message or group of messages NRP contains a measured angle of arrival relative to an antenna array as the result of measurement related to the position of the UE, and the orientation of the antenna array in a coordinate system common to the contributing sites as the additional information.

In the second example implementation, the orientation of the antenna array changes less frequently than the UE position. Therefore, separate messages are preferred over a single message for the result of measurement related to the position of the UE and the additional information.

According to the first and second example implementations, the NRP message(s) may contain one or more of the following optional fields:
number of antennas of the gNB;
height of gNB array on the ground;
orientation of antenna array at BS and/or UE or of individual antenna positions (including e.g. horizontal orientation and position, elevation);
ID of the access point (e.g. BS) used for the process;
active or passive BS state, and likelihood of the positioning information (also referred to here as position information);
antenna weights selected for precoding or reception at BS during communication;
beam IDs or direction of beams selected for communication; and
geometrical information about antenna setup.

According to at least some embodiments, improved accuracy is provided due to inclusion of angular information from multiple sites.

According to at least some embodiments, improved accuracy is provided by weighted combining using a quality indicator for deriving the weights.

According to at least some embodiments, accuracy is increased by increasing the number of measurements, e.g. number of access points, distance and/or angle.

According to at least some embodiments, resources are saved by selecting only a subset of measurements to have only light overhead.

Figure 5:
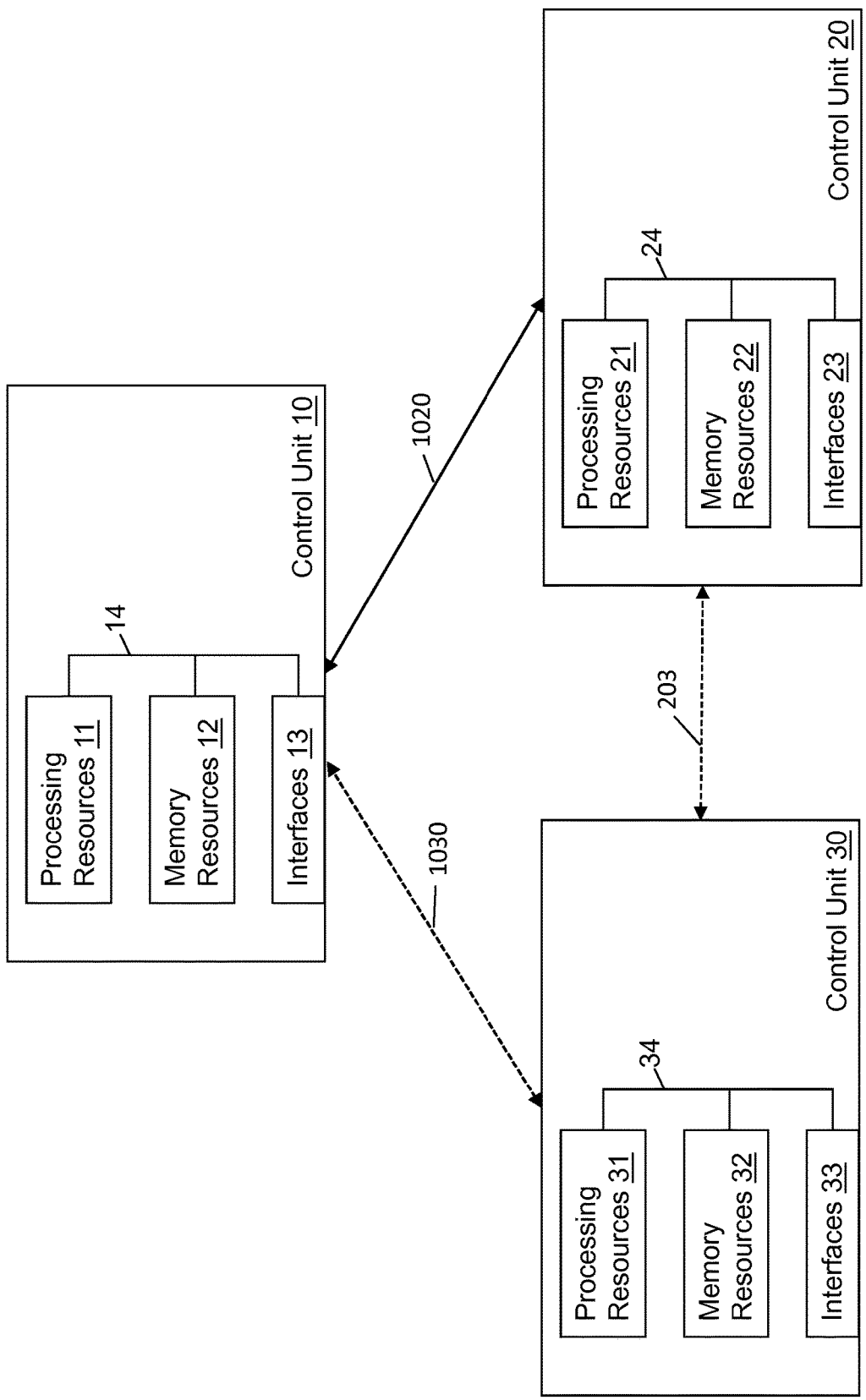
FIG. 5 shows a schematic block diagram illustrating a configuration of control units in which example embodiments are implementable.

Now reference is made to FIG. 5 for illustrating a simplified block diagram of various electronic devices that are suitable for use in practicing at least some of the example embodiments.

FIG. 5 shows a control unit 10 which may be part of and/or used by an access point (e.g. a base station, a base transceiver station, a radio head, a remote radio head, at least one of TRXs 110, 120, 130 of FIG. 2, first access point 101, second access point 102, Nth access point 105 of FIG. 3, DU 100 of FIG. 4).

The control unit 10 comprises processing resources (e.g. processing circuitry) 11, memory resources (e.g. memory circuitry) 12 and interfaces (e.g. interface circuitry) 13, coupled via a connection (e.g. a bus) 14.

The control unit 10 is coupled to a control unit 20 via a connection 1020, and to a control unit 30 via a connection 1030.

According to an example implementation, the control unit 10 executes process 1 shown in FIG. 1.

The control unit 20 may be part of and/or used by a central node (e.g. location server 220 of FIG. 2, central node 201 of FIG. 3, location server 200 of FIG. 4).

The control unit 20 comprises processing resources (e.g. processing circuitry) 21, memory resources (e.g. memory circuitry) 22 and interfaces (e.g. interface circuitry) 23, coupled via a connection (e.g. a bus) 24.

The control unit 20 is coupled to the control unit 20 via a connection 203.

According to an example implementation, the control unit 20 executes process 2 shown in FIG. 1.

The control unit 30 may be part of and/or used by a user equipment (e.g. UE 300 of FIG. 4).

The control unit 30 comprises processing resources (e.g. processing circuitry) 31, memory resources (e.g. memory circuitry) 32 and interfaces (e.g. interface circuitry) 33, coupled via a connection (e.g. a bus) 34.

According to an example implementation, the control unit 30 executes process 3 shown in FIG. 1.

Further, as used in this application, the term "circuitry" refers to one or more or all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the memory resources 12, 22, 32 includes a program which is assumed to include program instructions that, when executed by the associated processing resources 11, 21, 31, enable the electronic device to operate in accordance with the example embodiments and example implementations, as detailed above.

In general, at least some embodiments are implemented by computer software stored in the memory resources 12, 22, 32 and executable by the corresponding processing resources 11, 21, 31, or by hardware, or by a combination of software and/or firmware and hardware in any or all of the devices shown.

Generally, a user equipment (UE) comprises a cellular phone, smart phone, laptop, handheld, tablet, vehicle, or the like. A user equipment may also comprise a module, a modem on module, a system in package or a system on chip which can be connected to or inserted in the user equipment. The user equipment may be fixed shape or it may be used in different form factors.

According to an example embodiment, an apparatus of a plurality of apparatuses is provided, which provide access for user equipments to a communication network. According to an example implementation, the apparatus comprises control unit 10 of FIG. 5. According to an alternative example embodiment or in addition, the apparatus executes process 1 of FIG. 1.

The apparatus comprises means for acquiring a result of a measurement related to a position of a user equipment, means for acquiring additional information comprising at least one of an evaluation of the result of the measurement and a reference towards which the measurement was done, wherein the additional information is to be used for combining results of measurements related to the position of the user equipment, which have been acquired by the plurality of apparatuses, and means for transmitting, in at least one message, at least one of the result of the measurement and the additional information.

According to an example implementation, the apparatus comprises an access point.

According to an example implementation, the apparatus comprises at least one item of the following group: a base station, a base transceiver station, a radio head, a remote radio head, a gNodeB, a distributed unit, and a distributed unit of a gNodeB.

According to an example implementation, the result of the measurement comprises at least one item of the following group: a delay time of signals transmitted between the user equipment and the access point, a time of arrival of signals transmitted between the user equipment and the apparatus, a received signal strength of signals transmitted between the user equipment and the apparatus, a distance between the user equipment and the apparatus, an angle of arrival of signals transmitted between the user equipment and the apparatus, and a direction of arrival of signals transmitted between the user equipment and the apparatus.

According to an example implementation, the reference comprises at least one of a reference direction to which the angle of arrival was measured and an orientation of an antenna array.

According to an example implementation, the evaluation comprises a quality of the measurement comprising at least one item of the following group: a reliability of the measurement, a likelihood of the measurement, a quality index of the measurement, and a signal to noise ratio on a channel via which the signals transmitted between the user equipment and the apparatus are received.

According to an example implementation, the means for acquiring a result of a measurement comprises means for estimating position information on the position of the user equipment, the means for acquiring additional information comprises means for estimating a reliability of the estimated position information, and the means for transmitting is configured to transmit the estimated position information as the result of the measurement, and transmit the estimated reliability as the evaluation.

According to an example implementation, the means for estimating position information comprises at least one of means for measuring at least one of a direction and an angle of arrival of signals from the user equipment relative to a reference direction, means for measuring at least one of a direction and an angle of arrival of signals from the user equipment relative to an orientation of an antenna array of the apparatus, means for measuring a distance between the apparatus and the user equipment by measuring a received power of reference signals, means for measuring a distance between the apparatus and the user equipment by measuring propagation time, and means for measuring a delay time of signals communicated between the apparatus and the user equipment.

According to an example implementation, the means for acquiring a result of a measurement comprises means for measuring an angle of arrival of signals from the user equipment relative to a reference direction, the reference comprises the reference direction in a coordinate system common to the plurality of apparatuses, and the means for transmitting is configured to transmit the angle of arrival as the result of the measurement.

According to an example implementation, the means for transmitting further is configured to transmit the reference direction as the reference.

According to an example implementation, the means for acquiring a result of a measurement comprises means for receiving the result of the measurement from the user equipment.

According to an example implementation, the means for acquiring additional information comprises means for receiving the additional information from at least one of the user equipment, another apparatus of the plurality of apparatuses, and a database of the communication network.

According to an example implementation, the apparatus comprises means for receiving an indication of user specific position reference signals from at least one of a central node and another apparatus of the plurality of apparatuses.

According to an example implementation, the apparatus comprises means for using the user specific position reference signals for acquiring the result of the measurement related to the position of the user equipment.

According to an example implementation, the apparatus comprises means for transmitting the indication of user specific position reference signals to the user equipment.

According to an example implementation, the apparatus comprises means for receiving a request to perform at least one of measurements and estimations for acquiring position information and transmit the results of the measurements or estimations to a central node, and means for, in response to the request, acquiring and transmitting to the central node at least one of the result of the measurement and the additional information.

According to an example implementation, the means for receiving is configured to receive at least one of the indication and the request from at least one of the central node and another apparatus of the plurality of apparatuses.

According to an example implementation, the apparatus comprises means for transmitting at least one of an indication of user specific position reference signals and a request to perform at least one of measurements and estimations for acquiring position information to at least one other apparatus of the plurality of apparatuses.

According to an example implementation, the apparatus comprises means for receiving, from at least one other apparatus of the plurality of apparatuses, at least one message comprising at least one of a result of a measurement related to the position of the user equipment and additional information comprising at least one of an evaluation of the result of the measurement and a reference towards which the measurement was done, and mean for transmitting the at least one message to a central node.

According to an example implementation, the apparatus comprises meand for transmitting a request for the additional information to at least one of the user equipment, another apparatus of the plurality of apparatuses, and a database of the communication network.

According to an example embodiment, an apparatus of a communication network is provided. According to an example implementation, the apparatus comprises control unit 20 of FIG. 5. According to an alternative example embodiment or in addition, the apparatus executes process 2 of FIG. 1.

The apparatus comprises means for receiving, from each of a plurality of access points, a result of a measurement related to a position of a user equipment, means for receiving additional information comprising at least one of an evaluation of the result of the measurement and a reference towards which the measurement was done, and means for calculating the position of the user equipment by combining the results of the measurements received from the plurality of access points using at least one of the evaluation and the reference.

According to an example implementation, the apparatus comprises a central node.

According to an example implementation, the central node comprises at least one item of the following group: a location server, a central unit, and a central unit of a gNodeB.

According to an example implementation, the apparatus comprises means for transmitting an indication of user specific position reference signals to be used for acquiring the result of the measurement related to the position of the user equipment to at least one of the plurality of access points.

According to an alternative example implementation or in addition, the apparatus comprises means for transmitting a request to at least one of the plurality of access points to perform at least one of measurements and estimations for acquiring position information and transmit the results of the measurements or estimations to the apparatus.

According to an example implementation, the apparatus comprises means for indicating the calculated position to at least one of the user equipment and the communication network.

According to an example implementation, the apparatus comprises means for receiving the additional information from at least one of: the user equipment, at least one of the plurality of access points, and a database of the communication network.

According to an example embodiment, an apparatus is provided. According to an example implementation, the apparatus comprises control unit 30 of FIG. 5. According to an alternative example embodiment or in addition, the apparatus executes process 3 of FIG. 1.

The apparatus comprises means for acquiring additional information comprising at least one of an evaluation of a result of a measurement related to a position of the apparatus and a reference towards which the measurement was done, wherein the additional information is to be used for combining results of measurements related to the position of the apparatus, which are acquired by a plurality of access points which provide access for apparatuses to a communication network, and means for transmitting the additional information to at least one of the plurality of access points.

According to an example implementation, the apparatus comprises a user equipment.

According to an example implementation, the apparatus comprises means for receiving, from the at least one access point, at least one of:
  an indication of user specific position reference signals to be used for performing the measurement related to the position of the apparatus, and
  a request for the additional information.

According to an example implementation, the reference comprises at least one item of the following group:
  a number of antennas of the access point, a height of an antenna array of the access point on the ground,
a height of an antenna array of the user equipment on the ground,
an orientation of an antenna array of the access point,
an orientation of an antenna array of the user equipment,
an orientation of individual antenna positions of the access point,
an orientation of individual antenna positions of the user equipment,
an identifier of the access point,
an indication of an active or passive state of the access point,
antenna weights selected for precoding or reception at the access point during communication with the user equipment,
beam identifier and/or direction of beams selected for communication with the user equipment, and
geometrical information about antenna setup, and wherein the evaluation comprises a likelihood of the result of the measurement related to the position of the user equipment.

It is to be understood that the above description is illustrative and is not to be construed as limiting the disclosure. Various modifications and applications may occur to those skilled in the art without departing from the true spirit and scope as defined by the appended claims.

The invention claimed is:

1. A method executed by an access point of a plurality of access points which provide access for user equipment to a communication network, the method comprising:
acquiring a result of a measurement related to a position of a user equipment, wherein the result comprises an angle of arrival of signals transmitted between the user equipment and the access point;
acquiring additional information comprising:
an evaluation of the result of the measurement, wherein the evaluation comprises a quality of the measurement comprising at least one item of the following group:
a reliability of the measurement,
a likelihood of the measurement,
a quality index of the measurement, and
a signal to noise ratio on a channel via which the signals transmitted between the user equipment and the access point are received; and
a reference towards which the measurement was done, wherein the reference comprises at least one of a reference direction to which the angle of arrival was measured and an orientation of an antenna array; and
transmitting, to a central node, in at least one message, the result of the measurement and the additional information, wherein the additional information is to be used by the central node for combining the result of the measurement related to the position of the user equipment, which have been acquired by the plurality of access points.

2. The method of claim 1, wherein
the access point comprises at least one item of the following group: a base station, a base transceiver station, a radio head, a remote radio head, a gNodeB, a distributed unit, and a distributed unit of a gNodeB, and
the central node comprises at least one item of the following group: a location server, a central unit, and a central unit of a gNodeB.

3. The method of claim 1, wherein
the acquiring the result of the measurement comprises:
estimating, by the access point, position information on the position of the user equipment;
the acquiring additional information comprises:
estimating a reliability of the estimated position information; and
the transmitting comprises:
transmitting the estimated position information as the result of the measurement, and transmitting the estimated reliability as the evaluation.

4. The method of claim 3, wherein the estimating position information comprises at least one of:
measuring at least one of a direction and an angle of arrival of signals from the user equipment relative to a reference direction;
measuring at least one of a direction and an angle of arrival of signals from the user equipment relative to an orientation of an antenna array of the access point;
measuring a distance between the access point and the user equipment by measuring a received power of reference signals;
measuring a distance between the access point and the user equipment by measuring propagation time; and
measuring a delay time of signals communicated between the access point and the user equipment.

5. The method of claim 1, wherein
the acquiring the result of the measurement comprises:
measuring, by the access point, an angle of arrival of signals from the user equipment relative to a reference direction;
the reference comprises the reference direction in a coordinate system common to the plurality of access points; and
the transmitting comprises:
transmitting the angle of arrival as the result of the measurement.

6. The method of claim 5, wherein the transmitting further comprises:
transmitting the reference direction as the reference.

7. The method of claim 1, wherein
the acquiring the result of the measurement comprises:
receiving the result of the measurement from the user equipment.

8. A method executed by a user equipment, the method comprising:
acquiring additional information comprising
an evaluation of a result of a measurement related to a position of the user equipment and a reference towards which the measurement was done, wherein the result comprises an angle of arrival of signals transmitted between the user equipment and an access point, wherein the reference comprises at least one of a reference direction to which the angle of arrival was measured and an orientation of an antenna array, and wherein the evaluation comprises a quality of the measurement comprising at least one item of the following group:
a reliability of the measurement,
a likelihood of the measurement,
a quality of index of the measurement, and
a signal to noise ratio on a channel via which the signals transmitted between the user equipment and the access point are received,
wherein the additional information is to be used by a central node for combining the result of the measurement related to the position of the user equipment, which are acquired by a plurality of access points which provide access for user equipments to a communication network; and transmitting the additional information to at least one of the plurality of access points.

9. The method of claim 8, further comprising:
receiving, from the at least one access point, at least one of:
an indication of user specific position reference signals to be used for performing the measurement related to the position of the user equipment, and
a request for the additional information.

10. An apparatus of a plurality of apparatuses which provide access for user equipment to a communication network, the apparatus comprising:
at least one processor; and
at least one memory storing instructions, wherein the instructions, when executed by the at least one processor, cause the apparatus at least to perform:
acquiring a result of a measurement related to a position of a user equipment, wherein the result comprises an angle of arrival of signals transmitted between the user equipment and the access point;
acquiring additional information comprising:
an evaluation of the result of the measurement, wherein the evaluation comprises a quality of the measurement comprising at least one item of the following group:
a reliability of the measurement, a likelihood of the measurement,
a likelihood of the measurement, a quality index of the measurement, and a signal to noise ratio on a channel via which the signals transmitted between the user equipment and the access point are received; and
a reference towards which the measurement was done, wherein the reference comprises at least one of a reference direction to which the angle of arrival was measured and an orientation of an antenna array; and
transmitting, to a central node, in at least one message, the result of the measurement and the additional information, wherein the additional information is to be used by the central node for combining the result of the measurement related to the position of the user equipment, which have been acquired by the plurality of apparatuses.

11. The apparatus of claim 10, wherein
the apparatus comprises at least one item of the following group: a base station, a base transceiver station, a radio head, a remote radio head, a gNodeB, a distributed unit, and a distributed unit of a gNodeB, and
the central node comprises at least one item of the following group: a location server, a central unit, and a central unit of a gNodeB.

12. The apparatus of claim 10, wherein
the acquiring the result of the measurement comprises:
estimating, by the apparatus, position information on the position of the user equipment;
the acquiring additional information comprises:
estimating a reliability of the estimated position information; and
the transmitting comprises:

transmitting the estimated position information as the result of the measurement, and transmitting the estimated reliability as the evaluation.

13. The apparatus of claim 12, wherein the estimating position information comprises at least one of:
measuring at least one of a direction and an angle of arrival of signals from the user equipment relative to a reference direction;
measuring at least one of a direction and an angle of arrival of signals from the user equipment relative to an orientation of an antenna array of the apparatus;
measuring a distance between the apparatus and the user equipment by measuring a received power of reference signals;
measuring a distance between the apparatus and the user equipment by measuring propagation time; and
measuring a delay time of signals communicated between the apparatus and the user equipment.

14. The apparatus of claim 10, wherein
the acquiring the result of the measurement comprises:
measuring, by the apparatus, an angle of arrival of signals from the user equipment relative to a reference direction;
the reference comprises the reference direction in a coordinate system common to the plurality of apparatuses; and
the transmitting comprises:
transmitting the angle of arrival as the result of the measurement.

15. The apparatus of claim 14, wherein the transmitting further comprises:
transmitting the reference direction as the reference.

16. The apparatus of claim 10, wherein
the acquiring the result of the measurement comprises:
receiving the result of the measurement from the user equipment.

17. The apparatus of claim 10, wherein
the acquiring additional information comprises receiving the additional information from at least one of the user equipment, another apparatus of the plurality of apparatuses, and a database of the communication network.

18. The apparatus of claim 10, wherein the at least one memory and the computer program code are configured to, with the at least one processor, cause the apparatus to further perform:
receiving an indication of user specific position reference signals from at least one of a central node and another apparatus of the plurality of apparatuses.

19. The apparatus of claim 18, wherein the at least one memory and the computer program code are configured to, with the at least one processor, cause the apparatus to further perform:
using the user specific position reference signals for acquiring the result of the measurement related to the position of the user equipment.

20. The apparatus of claim 18, wherein the at least one memory and the computer program code are configured to, with the at least one processor, cause the apparatus to further perform:
transmitting the indication of user specific position reference signals to the user equipment.

* * * * *